United States Patent
Choi et al.

(10) Patent No.: US 11,960,821 B2
(45) Date of Patent: Apr. 16, 2024

(54) APPARATUS AND METHOD FOR PROVIDING ELECTRIC BOOK

(71) Applicant: WOONGJIN THINKBIG CO., LTD., Paju-si (KR)

(72) Inventors: Samrak Choi, Paju-si (KR); Uiyoung Kim, Paju-si (KR); Inyoung Song, Paju-si (KR)

(73) Assignee: WOONGJIN THINKBIG CO., LTD., Paju-si (KR)

( * ) Notice: Subject to any disclaimer, the term of this patent is extended or adjusted under 35 U.S.C. 154(b) by 25 days.

(21) Appl. No.: 17/468,437

(22) Filed: Sep. 7, 2021

(65) Prior Publication Data

US 2022/0075931 A1    Mar. 10, 2022

(30) Foreign Application Priority Data

Sep. 8, 2020    (KR) .......................... 10-2020-0114699

(51) Int. Cl.
  *G06F 40/166*    (2020.01)
  *G06F 3/0483*    (2013.01)
  *G06F 40/279*    (2020.01)

(52) U.S. Cl.
  CPC .......... *G06F 40/166* (2020.01); *G06F 3/0483* (2013.01); *G06F 40/279* (2020.01)

(58) Field of Classification Search
  CPC .................................................. G06F 40/166
  See application file for complete search history.

(56) References Cited

U.S. PATENT DOCUMENTS

| | | | |
|---|---|---|---|
| 8,744,855 B1* | 6/2014 | Rausch | G06F 17/2795 |
| 9,477,637 B1* | 10/2016 | Ward et al. | G06F 17/00 |
| 2013/0268370 A1 | 10/2013 | Bae | |
| 2014/0172418 A1* | 6/2014 | Puppin | G06F 17/2735 |

FOREIGN PATENT DOCUMENTS

| | | |
|---|---|---|
| JP | 2009-140073 A | 6/2009 |
| KR | 10-1204348 B1 | 11/2012 |
| KR | 10-2015-0062072 A | 6/2015 |

OTHER PUBLICATIONS

Lee, et al., "Efficient Web Document Search According to User's Understanding Level," information the Journal of the Hoeseongdae: The Practice of Computing and Letter, vol. 15, Issue 1, pp. 38-46 (2009).
KR Office Action dated Jan. 20, 2021 as received in Application No. 10-2020-0114699.

* cited by examiner

*Primary Examiner* — James J Debrow
(74) *Attorney, Agent, or Firm* — Maschoff Brennan

(57) ABSTRACT

Disclosed are an apparatus and method for providing an electronic book, which can provide an electronic book in which the levels of words are changed depending on the reading level of a user. The apparatus may provide an electronic book whose changeable words are each changed to a word having the same meaning and a different word level, depending on the reading level of a user, thereby enabling the user to easily read the electronic book including difficult words, and enabling the user to learn difficult words while reading the electronic book.

14 Claims, 12 Drawing Sheets

[FIG. 1]
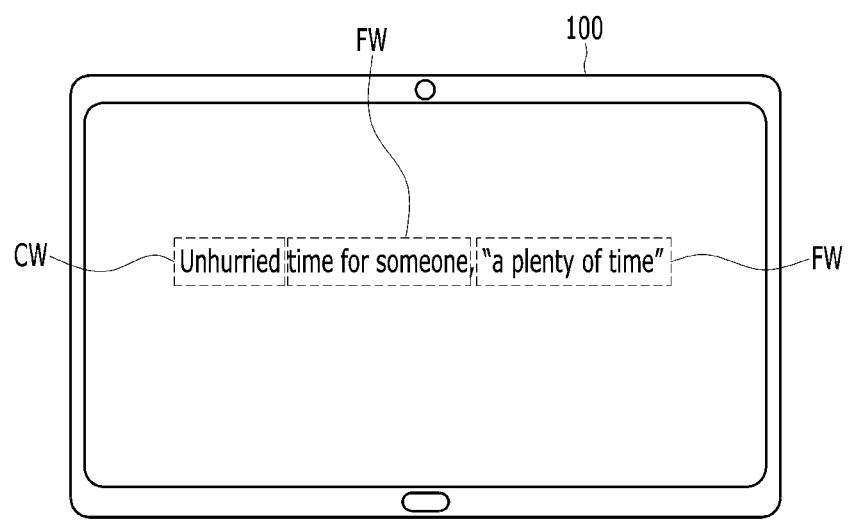

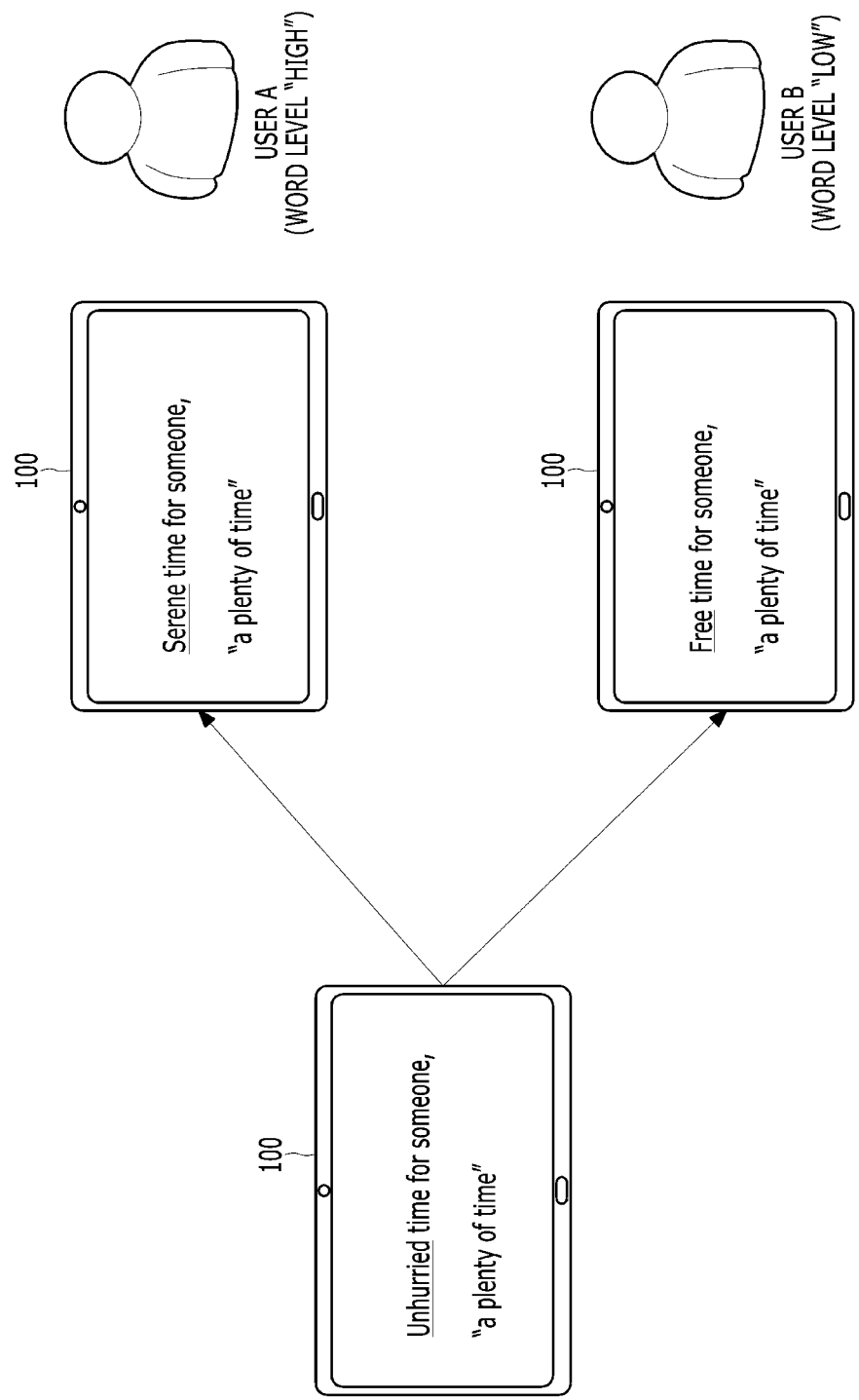
[FIG. 2]

[FIG. 3]
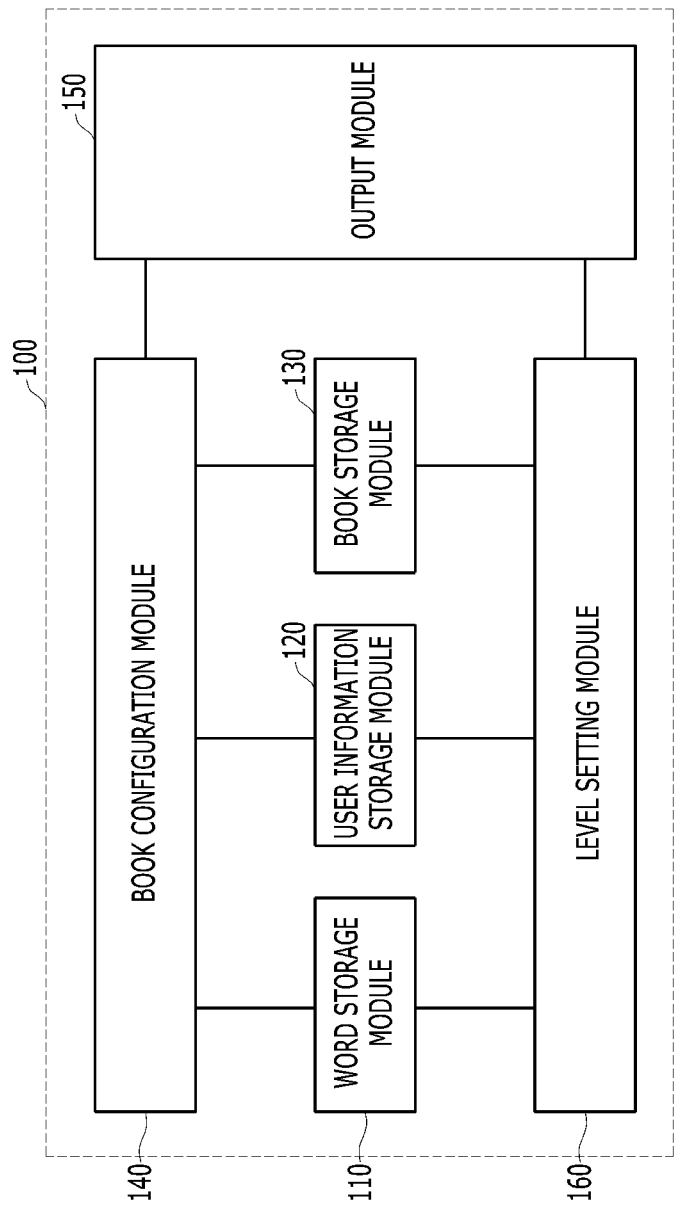

[FIG. 4]

| BOOK IDENTIFIER | WORD IDENTIFIER | CHANGEABLE WORD | WORD LEVEL |
|---|---|---|---|
| B1 | G1 | UNHURRIED | REFERENCE |
| B1 | G1 | SERENE | HIGH |
| B1 | G1 | LAZY | LOW |
| ⋮ | ⋮ | ⋮ | ⋮ |

[FIG. 5]
| BOOK IDENTIFIER | WORD IDENTIFIER | CHANGEABLE WORD | WORD LEVEL |
|---|---|---|---|
| B1 | G1 | UNHURRIED | REFERENCE |
| B1 | G1 | SERENE | HIGH |
| ⋮ | ⋮ | ⋮ | ⋮ |
| BOOK IDENTIFIER | WORD IDENTIFIER | CHANGEABLE WORD | WORD LEVEL |
|---|---|---|---|
| B1 | G1 | UNHURRIED | LOW |
| B1 | G1 | SERENE | REFERENCE |
| ⋮ | ⋮ | ⋮ | ⋮ |

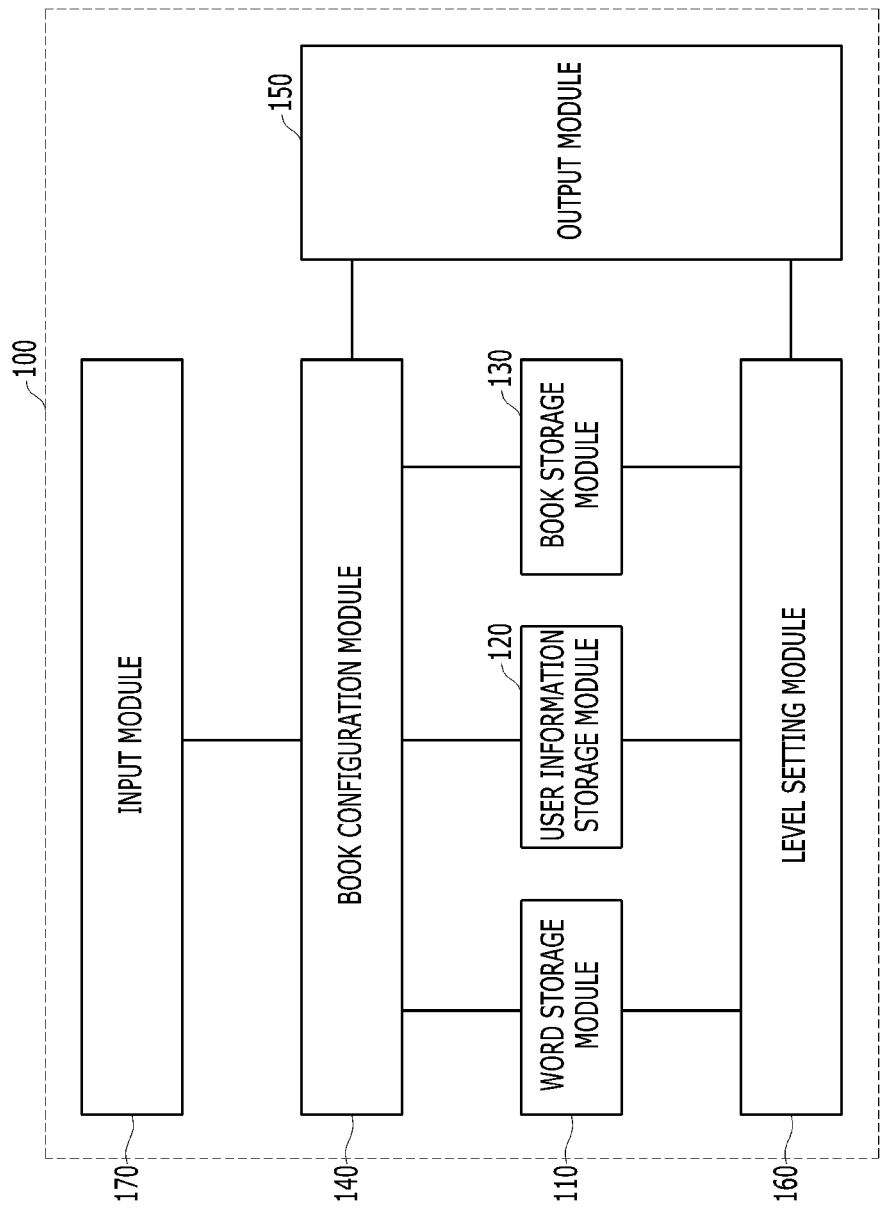
[FIG. 6]

[FIG. 7]
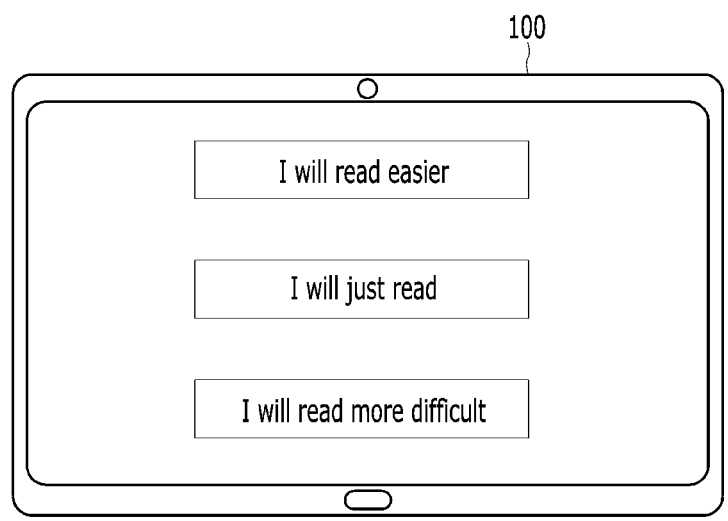

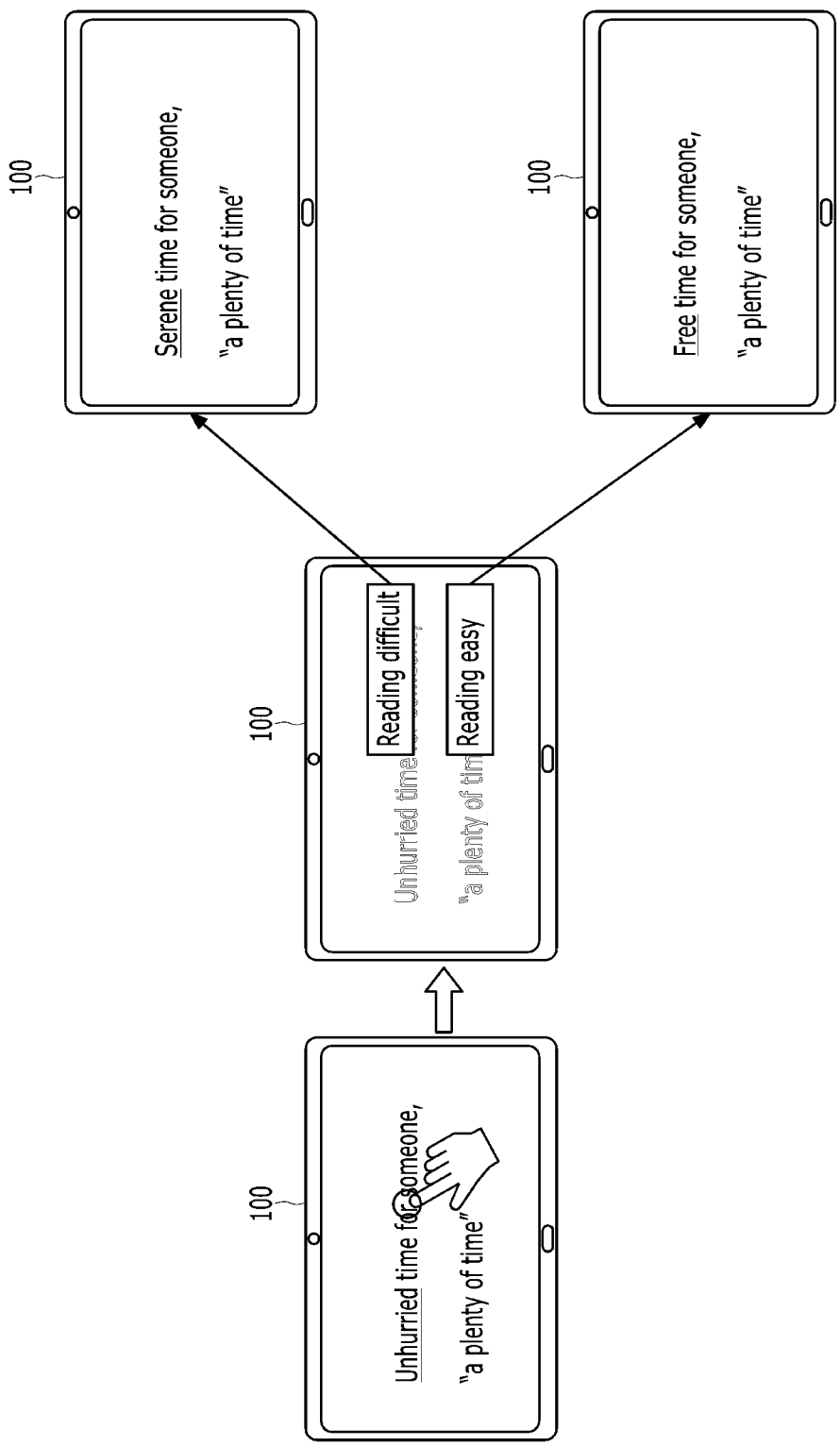

[FIG. 9]
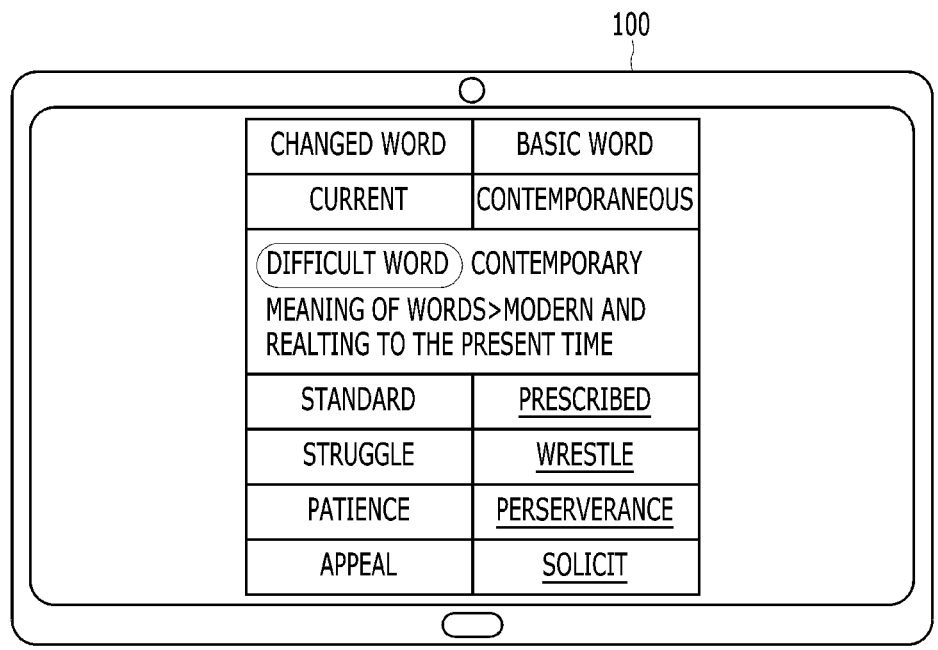

[FIG. 10]
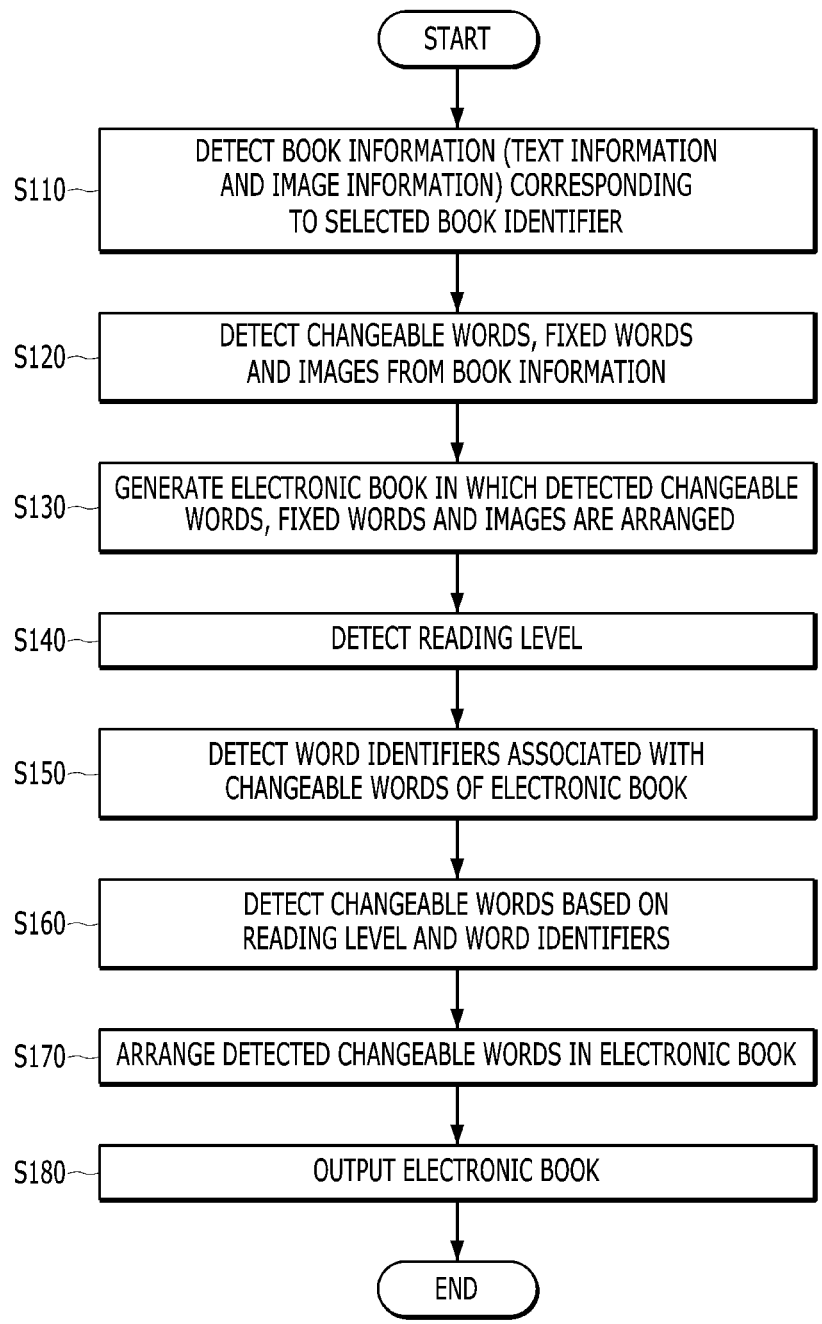

[FIG. 11]
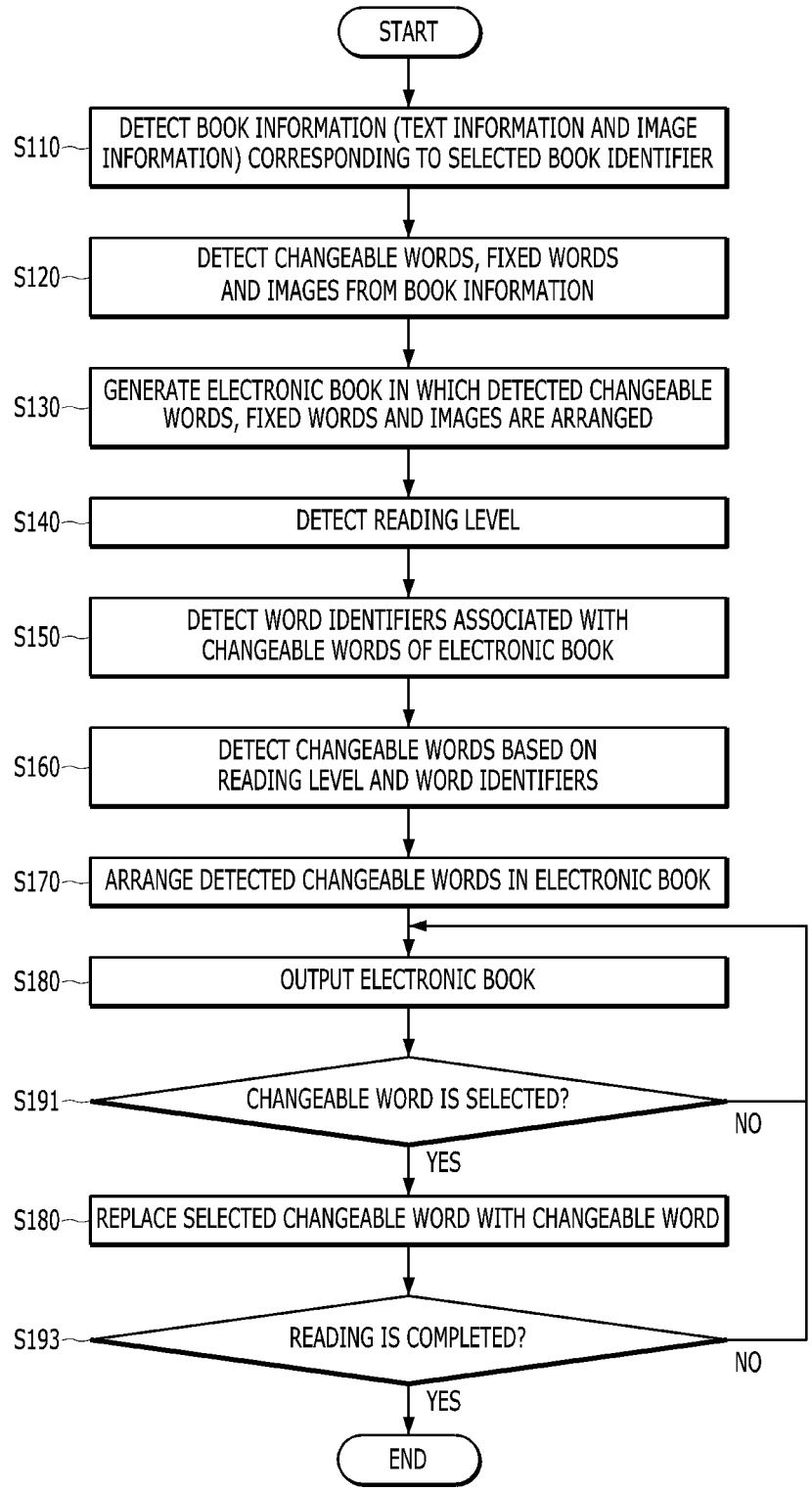

[FIG. 12]
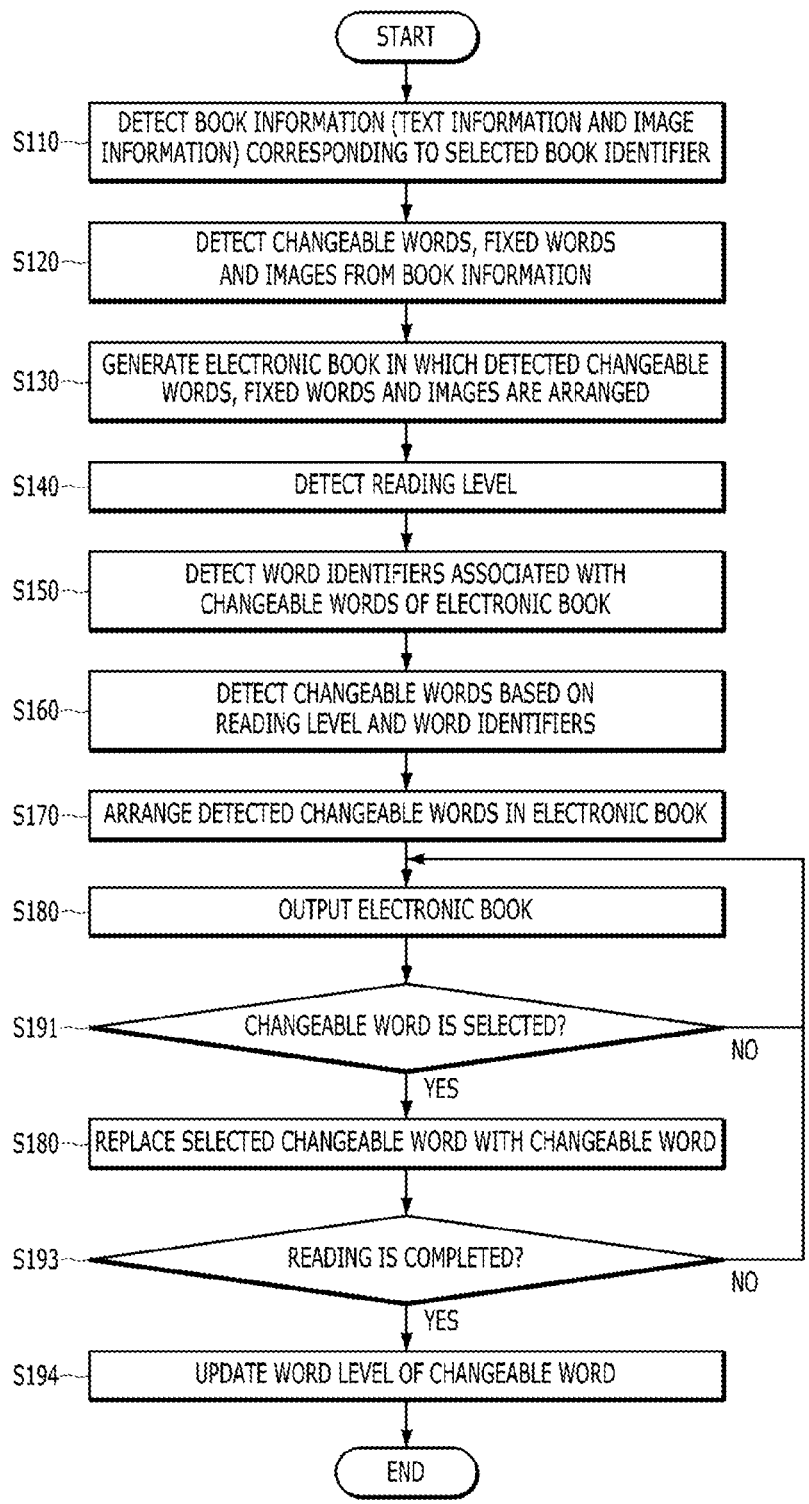

APPARATUS AND METHOD FOR PROVIDING ELECTRIC BOOK

TECHNICAL FIELD

The present disclosure relates to an apparatus and method for providing an electric book, and more particularly, to an apparatus and method for providing an electric book, which can change the difficulty levels of words depending on a user.

BACKGROUND ART

An electronic book is created by converting the contents of a real book into image files and text files, and thus enables a reader to read the contents through a reader terminal. The demand for electronic books is rapidly increasing with the popularization of reader terminals such as an electronic book-dedicated terminal, a smart phone, a laptop computer and a tablet computer.

A user connects to an electronic book providing server for providing electronic books, by using a reader terminal connected to a network. The reader terminal downloads an electronic book such as an image file and text file from the electronic book providing server, and then outputs the electronic book through a display.

According to the related art, an apparatus for providing an electronic book provides an electronic book having the same vocabularies to a user with a high-level vocabulary capability and a user with a low-level vocabulary capability. Therefore, one electronic book may be felt too easy or difficult for each user. In this case, the concentration level of the user may be degraded.

The contents described in the above background art is to promote understanding of the background of the invention, and may contain matters which are not prior arts already known to a person skilled in the art to which the present technology pertains.

Related Art Document

[Patent Document]
Korean Patent No. 10-1204348

SUMMARY OF INVENTION

Technical Problem

The present disclosure is proposed to solve the above conventional problem, and an object of the present disclosure is to provide an apparatus and method for providing an electric book in which the difficulty levels of words are changed depending on a user.

Solution to Problem

To achieve the object, an apparatus for providing an electronic book according to an exemplary embodiment of the present disclosure includes: a book configuration module configured to receive book information as a response to a book information detection request signal including a book identifier, arrange the word identifier of a changeable word and a fixed word, which are included in the book information, generate an electronic book by arranging a changeable word received as a response to a word detection request signal including a user reading level and the word identifier, and output an output request signal including the electronic book; a book storage module configured to store book information constituting an electronic book, and transmit book information to the book configuration module in response to the book information detection request signal of the book configuration module, the book information including text information composed of the word identifier of the changeable word and the fixed word; a word storage module configured to associate each of changeable words constituting an electronic book with a word level and a word identifier, store the changeable word associated with the word level and the word identifier, primarily detect changeable words corresponding to the user reading level in response to the word detection request signal of the book configuration module, detect the changeable word associated with the word identifier among the primarily detected changeable words, and transmit the detected changeable word to the book configuration module; and an output module configured to detect the electronic book from an output request signal in response to the output request signal of the book configuration module, and output the electronic book.

The book configuration module may detect the arrangement locations of the changeable word and the fixed word from the text information, and generate the electronic book by arranging the changeable word and the fixed word at the detected arrangement locations.

The book configuration module may generate the electronic book by arranging the changeable word, received as a response to the word detection request signal, at the arrangement position of the changeable word detected from the text information.

The word storage module may associate changeable words, which have the same meaning and different word levels, with the same word identifier, and store the changeable words.

The apparatus may further include a level setting module configured to update the word level of each of the changeable words stored in the word storage module, based on an exposure count of the changeable word and a focusing count of the changeable word.

The apparatus may further include an input module configured to receive one piece of selection information among a normal reading level, a high reading level and a low reading level, in order to set the user reading level.

The apparatus may further include an input module configured to receive selection information including the changeable word of the electronic book outputted from the output module. The book configuration module may detect a changeable word which is associated with the same word identifier as the changeable word selected on the basis of the selection information, and associated with a word level different from the selected changeable word, and the output module may replace the selected changeable word with the changeable word detected by the book configuration module, and output the electronic book. At this time, the book configuration module may generate a collection screen including changeable words changed on the basis of the selection information of the input module and the changeable words before the change.

To achieve the object, a method for providing an electronic book according to an exemplary embodiment of the present disclosure includes: detecting book information including text information, based on a book identifier; detecting the word identifier of a changeable word and a fixed word from the book information detected in the detecting of the book information; generating an electronic book by arranging the word identifier of the changeable word and the fixed word, which are detected in the detecting of the word identifier of the changeable word and the fixed word; detecting a user reading level; detecting a word identifier included in the electronic book generated in the generating of the electronic book; detecting a changeable word based on the user reading level and the word identifier; arranging the changeable word, detected in the detecting of the changeable word, in the electronic book generated in the generating of the electronic book; and outputting the electronic book in which the changeable word is arranged.

The detecting of the word identifier of the changeable word and the fixed word may include further detecting the arrangement locations of the changeable word and the fixed word, and the generating of the electronic book may include generating an electronic book by arranging the word identifier of the changeable word and the fixed word at the arrangement positions detected in the detecting of the word identifier of the changeable word and the fixed word.

The arranging of the changeable word may include arranging the changeable word, detected in the detecting of the changeable word, at an arrangement position matched with the word identifier.

The method may further include associating changeable words, which have the same meaning and different word levels, with the same word identifier, and storing the changeable words, before the detecting of the changeable word.

The method may further include updating the word level of each of the changeable words, based on an exposure count of the changeable word and a focusing count of the changeable word, after the outputting of the electronic book.

The detecting of the user reading level may include receiving one piece of selection information among a normal reading level, a high reading level and a low reading level.

The method may further include: receiving selection information including the changeable words of the electronic book, after the outputting of the electronic book; and replacing a changeable word selected among the changeable words of the electronic book with another changeable word, based on the selection information, and outputting the electronic book. The replacing of the changeable word may include detecting a changeable word which is associated with the same word identifier as the selected changeable word and associated with a word level different from the selected changeable word, replacing the selected changeable word with the detected changeable word, and outputting the electronic book. At this time, the electronic book providing method may further include generating a collection screen including the changeable word changed on the basis of the selection information and the changeable word before the change.

Advantageous Effects

According to the present disclosure, the apparatus and method for providing an electronic book may provide an electronic book in which the levels of words are changed depending on the reading level of a user, thereby enabling the user to easily read an electronic book including difficult words.

Furthermore, the apparatus and method may provide an electronic book in which the levels of words are changed depending on the reading level of a user, thereby enabling the user to learn difficult words while reading the electronic book.

BRIEF DESCRIPTION OF DRAWINGS

FIGS. 1 and 2 are diagrams for describing an apparatus for providing an electronic book in accordance with an embodiment of the present disclosure.

FIG. 3 is a diagram for describing a configuration of the apparatus for providing an electronic book in accordance with the embodiment of the present disclosure.

FIGS. 4 and 5 are diagrams for describing a word storage module of FIG. 3.

FIGS. 6 to 9 are diagrams for describing a modified example of the apparatus for providing an electronic book in accordance with the embodiment of the present disclosure.

FIG. 10 is a flowchart for describing a method for providing an electronic book in accordance with an embodiment of the present disclosure.

FIGS. 11 and 12 are flowcharts for describing a modified example of the method for providing an electronic book in accordance with an embodiment of the present disclosure.

DESCRIPTION OF EMBODIMENTS

Hereafter, exemplary embodiments will be described with reference to the accompanying drawings, in order to describe the technical idea of the present disclosure in detail such that a person skilled in the art to which the present disclosure pertains can easily carry out the technique idea of the present disclosure. First, it should be noted that the same components in the drawings are represented by like reference numerals even though the same components are illustrated in different drawings. Moreover, in describing the present disclosure, detailed descriptions for publicly known functions or configurations related to the present disclosure will be ruled out in order not to unnecessarily obscure the subject matters of the present disclosure.

An apparatus for providing an electronic book (hereafter, referred to as an electronic book providing apparatus) in accordance with an embodiment of the present disclosure is configured as a terminal such as a smart phone, tablet computer or laptop computer, which can output an electronic book. The electronic book providing apparatus may be configured as a server which provides an electronic book to a user terminal such as a smart phone, tablet computer or laptop computer, which can output an electronic book.

Referring to FIG. 1, the electronic book providing apparatus 100 outputs an electronic book selected by a user. Specifically, the electronic book providing apparatus 100 outputs an electronic book having changeable words CW and fixed words FW. The electronic book providing apparatus 100 outputs an electronic book having the changeable words CW which are changed according to the reading level of the user, and the fixed words FW which are fixed regardless of the reading level of the user.

The electronic book providing apparatus 100 changes the changeable words CW based on the reading level, and outputs the changed words. The electronic book providing apparatus 100 outputs an electronic book whose changeable words CW are composed of words having a reference word level corresponding to the average word level of users. When the reading level of the user is changed through the user's setting or reading history, the electronic book providing apparatus 100 outputs an electronic book whose changeable words CW are changed to words having a word level corresponding to the reading level.

At this time, when the reading level is high, the electronic book providing apparatus 100 outputs an electronic book whose changeable words CW are changed to words at a high word level. When the reading level is low, the electronic book providing apparatus 100 outputs an electronic book whose changeable words CW are changed to words at a low word level.

Through this operation, the electronic book providing apparatus 100 provides an electronic book composed of different words according to the reading levels of a plurality of users, when providing the electronic book to the plurality of users. In other words, when providing the same electronic book to two users, the electronic book providing apparatus 100 outputs an electronic book composed of difficult words to one user having a relatively high reading level, and outputs an electronic book composed of easy words to the other user having a relatively low level.

For example, FIG. 2 is based on the assumption that the electronic book providing apparatus 100 outputs an electronic book including a changeable word CW "unhurried", while the reading level of a user A is set to the high word level and the reading level of a user B is set to the low word level. The electronic book providing apparatus 100 generally outputs an electronic book including "unhurried" at the reference word level.

Since the reading level of the user A is relatively high, the electronic book providing apparatus 100 outputs an electronic book in which the changeable word CW "unhurried" at the reference word level is changed to a word "serene" at the high word level.

Since the reading level of the user B is relatively low, the electronic book providing apparatus 100 outputs an electronic book in which the changeable word CW "unhurried" at the reference word level is changed to a word "free" at the low word level.

The electronic book providing apparatus 100 sets and updates the word levels of the changeable words CW used in the electronic book. At this time, the word levels set to the changeable words CW may be different for each user. For example, the changeable word CW "unhurried" at the reference word level may be set to the high word level for the user A, and set to the low word level for the user B.

The electronic book providing apparatus 100 may measure the personal experience point of each user for each word through a process in which the user reads an electronic book, and update the word level of the changeable word CW by reflecting the personal experience point for each word. That is, the electronic book providing apparatus 100 calculates the experience point for each word through an exposure history to the same word, an eye tracking history to the same word, a personal learning history and the like while the user reads an electronic book, and updates the word level of the corresponding changeable word CW based on the experience point for each word.

For this operation, the electronic book providing apparatus 100 includes a word storage module 110, a user information storage module 120, a book storage module 130, a book configuration module 140, an output module 150 and a level setting module 160, as illustrated in FIG. 3.

The word storage module 110 stores a plurality of words which are used for configuring an electronic book. The word storage module 110 stores changeable words CW among the entire words which are used for configuring an electronic book.

The word storage module 110 stores a plurality of changeable words CW associated with the word levels thereof. For example, the word storage module 110 stores the plurality of changeable words CW each associated with one word level of the reference word level, the high word level and the low word level.

The word storage module 110 may associate the same changeable word CW with a different word level for each user, and stores the changeable word CW. In other words, when storing one changeable word CW, the word storage module 110 may associate the changeable word CW with the reference word level for a user 1, and associate the changeable word CW with the low word level for a user 2.

The word storage module 110 stores the plurality of changeable words CW each associated with a word identifier and book identifier. At this time, when storing changeable words CW which have the same meaning but have different word levels, the word storage module 110 associates the changeable words CW with the same word identifier.

For example, referring to FIG. 4, the word storage module 110 associates each of the words "unhurried", "serene" and "free", which have the same meaning and whose word levels are set to "normal", "high" and "low", respectively, with a word identifier "G1", and stores the words.

The word storage module 110 detects changeable words CW in response to a word detection request signal of the book configuration module 140. The word storage module 110 detects the book identifier and the reading level from the word detection request signal. The word storage module 110 primarily detects changeable words CW matched with the detected book identifier. The word storage module 110 secondarily detects a changeable word CW matched with the reading level detected from the word detection request signal, among the primarily detected changeable words CW. The word storage module 110 generates a response signal including the detected changeable word CW, and transmits the generated response signal to the book configuration module 140.

The word storage module 110 updates the word level of the changeable word CW in response to a word level down request signal of the level setting module 160. The word storage module 110 detects the word identifier from the word level down request signal, and updates the word level of the changeable word CW by lowering, by one level, the word level of the changeable word CW matched with the word identifier, among the stored changeable words CW.

For example, referring to FIG. 5, when the word level down request signal including a word identifier "G2" is received, the word storage module 110 lowers, by one level, each of the word levels of the changeable words CW "unhurried" and "serene", matched with the word identifier "G2". Thus, the word level of the changeable word CW "unhurried" is lowered from "normal" to "low", and the word level of the changeable word CW "serene" is lowered from "high" to "normal".

Furthermore, when receiving the word level down request signal including the word identifier and changeable words CW, the word storage module 110 may lower the word level of only one changeable word CW.

The user information storage module 120 stores the personal information of a user and the reading level of the user in association with each other. That is, when storing the personal information such as the ID, password, school and grade of the user, the user information storage module 120 associates the personal information with the reading level corresponding to the reading difficulty level of the user.

The book storage module 130 stores book information constituting the electronic book. The book storage module 130 stores the book information including text information and image information. The book storage module 130 associates the book information with the book identifier, and stores the book information. At this time, the text information includes changeable words CW each associated with a word identifier and an arrangement location and fixed words FW each associated with a word and an arrangement location, and the image information includes images each associated with an arrangement location.

The book storage module 130 may store data as book information in the form of a file in which only the changeable word CW can be changed. For example, the book storage module 130 may store, as the book information, an image file in which the fixed words FW and images are arranged, and the word identifiers are matched with the locations at which the changeable words CW are arranged.

The book storage module 130 detects the book information in response to a book information detection request of the book configuration module 140. The book storage module 130 detects the book identifier from the book information detection request, and detects the book information associated with the detected book identifier. At this time, the book storage module 130 detects one of the book information, associated with the text information and the image information, and the book information configured as an image file. The book storage module 130 generates a response signal including the detected book information, and transmits the generated response signal to the book configuration module 140.

The book configuration module 140 detects the electronic book information selected by the user from the book storage module 130. The book configuration module 140 detects the book identifier from the information selected by the user. The book configuration module 140 transmits the book information detection request including the book identifier to the book storage module 130.

The book configuration module 140 receives the book information including the text information and the image information as a response to the book information detection request. The book configuration module 140 detects the text information and the image information from the received book information. The book configuration module 140 generates an electronic book in the form of an image file in which the text information and the image information are arranged.

The book configuration module 140 detects the changeable words CW and the fixed words FW from the text information. The book configuration module 140 generates, as the electronic book, an image file in which the word identifiers are matched with the arrangement locations of the changeable words CW, the words are arranged at the arrangement locations of the fixed words FW, included in the fixed words FW, and the images are arranged on the basis of the arrangement locations detected from the image information.

Furthermore, when the image file in which the word identifiers are matched with the positions at which the respective changeable words CW are arranged, is received as the book information as a response to the book information detection request, the book configuration module 140 may detect the image file from the book information, and generate as an electronic book using the detected image file.

The book configuration module 140 transmits a user information detection request signal to the user information storage module 120. The book configuration module 140 receives the reading level of the user as a response to the user information detection request signal. The book configuration module 140 generates a word detection request signal including the book identifier and the reading level, and transmits the generated word detection request signal to the word storage module 110.

The book configuration module 140 detects the changeable word CW from the response signal to the word detection request signal. The book configuration module 140 detects the changeable word CW matched with the word identifier, and generates the electronic book by arranging the changeable word CW, matched with the word identifier matched with the electronic book, in the electronic book (i.e. image file). The book configuration module 140 finally generates the electronic book by arranging the changeable word CW, matched with the same word identifier, in the area matched with the word identifier in the electronic book. The book configuration module 140 generates an output request signal including the finally generated electronic book, and transmits the generated output request signal to the output module 150.

The output module 150 outputs the electronic book in response to the output request signal of the book configuration module 140. The output module 150 detects the electronic book from the output request signal, and outputs the detected electronic book. The output module 150 transmits an output signal to the level setting module 160, after outputting the electronic book.

The level setting module 160 sets and updates the word level of the changeable word CW stored in the word storage module 110. The level setting module 160 receives a level setting signal corresponding to each of the changeable words CW at the initial stage, and sets the word level of the corresponding changeable word CW based on the level setting signal. At this time, the level setting module 160 sets the reference word level to the word level of a changeable word CW with no level setting signal.

The level setting module 160 counts the exposure count (frequency) of each of the changeable words CW included in the electronic book outputted from the output module 150, in response to the output signal of the output module 150. When the exposure count is equal to or more than a preset exposure count, the level setting module 160 lowers the word level of the corresponding changeable word CW. In other words, when a changeable word CW is exposed (outputted) by the preset exposure count or more, the level setting module 160 considers that the user has learned the corresponding changeable word CW, and lowers the word level of the changeable word CW by one level. Thus, the level setting module 160 may differently set the word level of the same changeable word CW for each user.

When the word level is lowered in consideration of only the exposure count, it may be determined that the user has learned the changeable word CW through the simple exposure. Thus, the level setting module 160 performs eye tracking in response to the output signal of the output module 150. The level setting module 160 measures the number of times that the sight of the user is located at the changeable word CW, i.e. a focusing count (frequency), based on the eye tracking result. When the exposure count (frequency) is equal to or more than the preset exposure count and the focusing count (frequency) as the eye tracking result is equal to or more than a preset count, the level setting module 160 lowers the word level of the corresponding changeable word CW by one level.

When determining that the word level of the changeable word CW has been lowered, the level setting module 160 generates the word level down request signal including the word identifier of the changeable word CW, and transmits the generated word level down request signal to the word storage module 110. The level setting module 160 may generate the word level down request signal including the word identifier and the changeable word CW, and transmit the generated word level down request signal to the word storage module 110.

Referring to FIG. 6, the electronic book providing apparatus 100 may further include an input module 170 configured to receive selection information for changing the reading level or the changeable word CW of the electronic book outputted from the output module 150.

The electronic book providing apparatus 100 may generate an electronic book based on the reading level received from the user through the input module 170. The book configuration module 140 generates a reading level input screen output request, and transmits the generated reading level input screen output request to the output module 150. The output module 150 outputs a reading level setting screen in response to the reading level input screen output request of the book configuration module 140. The user inputs a reading level based on the reading level setting screen outputted by the output module 150, and the book configuration module 140 generates an electronic book based on the reading level inputted by the user.

For example, when a reading level setting screen illustrated in FIG. 7 is outputted by the output module 150, the user selects one of "I will read easier", "I will just read", and "I will read more difficult".

When the user selects "I will read easier", the book configuration module 140 sets the reading level to "low", and generates an electronic book including changeable words CW whose word level is "low". When the user selects "I will just read", the book configuration module 140 sets the reading level to "normal", and generates an electronic book including changeable words CW whose word level is "normal". When the user selects "I will read more difficult", the book configuration module 140 sets the reading level to "high", and generates an electronic book including changeable words CW whose word level is "high".

The electronic book providing apparatus 100 may change the changeable words CW to changeable words CW having a different level on the basis of the level of the changeable words CW, selected by the user through the input module 170, and output the changeable words CW having a different level. The book configuration module 140 generates an electronic book based on the reading level of the user, and the output module 150 outputs the electronic book generated by the book configuration module 140. When the user selects the changeable words CW of the electronic book while the output module 150 outputs the electronic book, the book configuration module 140 generates an electronic book by changing the changeable words CW selected by the user to the changeable words CW at a different word level.

For example, referring to FIG. 8, when a user touches "unhurried", which is a changeable word CW at the reference word level, while the output module 150 outputs an electronic book including a sentence "Unhurried time for someone, a plenty of time" in which the fixed words FW and the changeable word CW are combined, the output module 150 outputs a word level selection screen including a "Reading easy" button for selecting the low word level and a "Reading difficult" button for selecting the high word level.

When the user selects the "Reading easy" button, the book configuration module 140 generates an electronic book by changing "unhurried" at the reference word level to "free" at the low word level, and the output module 150 outputs the generated electronic book.

When the user selects the "Reading difficult" button, the book configuration module 140 generates an electronic book by changing "unhurried" at the reference word level to "serene" at the high word level, and the output module 150 outputs the generated electronic book.

As such, the electronic book providing apparatus 100 may change only the changeable word CW selected by the user to the changeable word CW at a different word level, and output the changed electronic book.

The book configuration module 140 may generate a collection screen including the changeable words CW whose word level has been changed through the input module 170. That is, referring to FIG. 9, the book configuration module 140 generates a collection screen including the changeable words CW changed by a user's selection and the changeable words CW before the change. The book configuration module 140 generates a collection screen output request including the collection screen, and transmits the generated collection screen output request to the output module 150. The output module 150 detects the collection screen from the collection screen output request, and output the detected collection screen. At this time, the book configuration module 140 may generate a collection screen on which the meanings of the changeable words CW are all displayed, or generate a collection screen on which only the meanings of the changeable words CW selected by the user through the input module 170 are selectively displayed.

Hereafter, a method for providing an electronic book in accordance with an embodiment of the present disclosure will be described in detail with reference to the accompanying drawings.

Referring to FIG. 10, the electronic book providing apparatus 100 outputs an electronic book selection screen including a plurality of electronic books. A user selects an electronic book, which the user intends to read, among the electronic books of the electronic book selection screen outputted by the electronic book providing apparatus 100. The electronic book providing apparatus 100 detects book information corresponding to the book identifier of the selected electronic book in step S110. The electronic book providing apparatus 100 detects text information changeable words CW and fixed words FW and image information including images.

The electronic book providing apparatus 100 detects the changeable words CW, the fixed words FW and the images from the book information in step S120. The electronic book providing apparatus 100 detects the changeable words CW including word identifiers and arrangement locations and the fixed words FW including the words and arrangement locations from the text information. The electronic book providing apparatus 100 detects the images and the arrangement locations of the images from the image information.

The electronic book providing apparatus 100 generates an electronic book in which the detected changeable words CW and fixed words FW and the images of the image information are arranged, in step S130. The electronic book providing apparatus 100 generates, as the electronic book, an image file in which the word identifiers of the changeable words CW are matched with the arrangement locations of the changeable words CW, the words of the fixed words FW are arranged at the arrangement locations of the fixed words FW, and the images detected from the image information are arranged at the arrangement locations of the images.

The electronic book providing apparatus 100 detects the reading level to detect the changeable words CW in step S140. That is, the electronic book providing apparatus 100 detects the reading level of the user who uses the electronic book. At this time, the electronic book providing apparatus 100 detects one of "normal", "high" and "low" as the reading level. The electronic book providing apparatus 100 may output a reading level setting screen (see FIG. 7) to detect the reading level, and detect the reading level selected by the user.

The electronic book providing apparatus 100 detects the word identifiers associated with the respective changeable words CW of the previously generated electronic book, in step S150. The electronic book providing apparatus 100 detects the word identifiers matched with the arrangement locations of the changeable words CW from the electronic book generated in step S130.

The electronic book providing apparatus 100 detects the changeable words CW based on the reading level and the word identifiers, in step S160. The electronic book providing apparatus 100 primarily detects the changeable words CW associated with the word identifiers detected in step S150, among the changeable words CW stored therein. The electronic book providing apparatus 100 secondarily detects the changeable word CW matched with the reading level detected in step S140, among the primarily detected changeable words CW. The electronic book providing apparatus 100 detects the secondarily detected changeable word CW as a final changeable word CW which is to be applied to the electronic book.

The electronic book providing apparatus 100 arranges the detected changeable word CW in the electronic book in step S170. The electronic book providing apparatus 100 generates an electronic book by arranging the changeable words CW, detected in step S160, at the locations, matched with the word identifiers of the changeable words CW, in the electronic book generated in step S130.

The electronic book providing apparatus 100 outputs the electronic book in which the changeable words CW are arranged, in step S180. At this time, the electronic book outputted by the electronic book providing apparatus 100 is set in such a state that a part of the entire text thereof is changed to the changeable words CW corresponding to the reading level of the user.

The method for providing an electronic book may change the changeable word CW selected by the user to the changeable word CW at a different word level.

Referring to FIG. 11, when a changeable word CW included in the output electronic book is selected by a user (Yes in step S210), the electronic book providing apparatus 100 replaces the selected changeable word CW with a changeable word CW having a different word level, and outputs the changed electronic book, in step S192. When the user selects the changeable word CW in the output electronic book, the electronic book providing apparatus 100 requests the user to select a word level different from the word level of the selected changeable word CW. When the user selects a different word level, the electronic book providing apparatus 100 detects a changeable word CW corresponding to the selected word level, replaces the selected changeable word CW with the detected changeable word CW, and outputs the changed electronic book.

Referring to FIG. 12, when the user completely reads the electronic book (Yes in step S193), the electronic book providing apparatus 100 may update the word level of the changeable word CW in step S194.

The electronic book providing apparatus 100 receives a level setting signal corresponding to each of the changeable words CW at the initial stage, and sets the word level of the corresponding changeable word CW based on the level setting signal. At this time, the level setting signal may be generated by a selection of the user, or generated by reflecting the reading history of the user. The electronic book providing apparatus 100 sets the word level of a changeable word CW with no level setting signal to the reference word level.

The electronic book providing apparatus 100 counts the exposure count (frequency) of the changeable word CW included in the output electronic book, and lowers the word level of the corresponding changeable word CW when the exposure count is equal to or more than a preset exposure count. That is, when a changeable word CW is exposed (outputted) by the preset exposure count or more, the electronic book providing apparatus 100 considers that the user has learned the corresponding changeable word CW, and lowers the word level of the changeable word CW by one level. Through this operation, the electronic book providing apparatus 100 may differently set the word level of the same changeable word CW for each user.

When the word level is lowered in consideration of only the exposure count, it may be determined that the user has learned the changeable word CW through the simple exposure. Thus, the electronic book providing apparatus 100 performs eye tracking when outputting the electronic book, and measures the focusing count (frequency) at which the sight of the user is located at the changeable word CW, based on the eye tracking result. When the exposure count (frequency) is equal to or more than the preset exposure count and the focusing count (frequency) as the eye tracking result is equal to or more than a preset count, the electronic book providing apparatus 100 lowers the word level of the corresponding changeable word CW by one level.

Although the preferred exemplary embodiments of the present disclosure have been described above, it is understood that the present disclosure may be modified in various forms, and those skilled in the art may practice various modified examples and changed examples without departing from the scope of the claims of the present disclosure.

The invention claimed is:

1. An apparatus for providing an electronic book, comprising:
a book configuration module configured to receive book information as a response to a book information detection request signal including a book identifier, arrange the word identifier of a changeable word and a fixed word, which are included in the book information, generate an electronic book for a user by arranging a changeable word received as a response to a word detection request signal including a user reading level of the user and the word identifier, and output an output request signal including the electronic book;
a book storage module configured to store book information constituting an electronic book, and transmit book information to the book configuration module in response to the book information detection request signal of the book configuration module, the book information including text information composed of the word identifier of the changeable word and the fixed word;
a word storage module configured to associate each of changeable words constituting an electronic book for the user with a word level and a word identifier, store the changeable word associated with the word level and the word identifier, primarily detect changeable words corresponding to the user reading level in response to the word detection request signal of the book configuration module, detect the changeable word associated with the word identifier among the primarily detected changeable words, and transmit the detected changeable word to the book configuration module;
an output module configured to detect the electronic book for the user from an output request signal in response to the output request signal of the book configuration module, and output the electronic book; and a level setting module configured to set the word level of the changeable words, wherein the book configuration module generates the electronic book for the user by arranging a changeable word whose word level is corresponding to the user reading level, wherein the word storage module stores the changeable words for each user such that the word levels associated the changeable words are different for at least two users, wherein the level setting module counts the number of exposures of each of the changeable words included in the electronic book for the user outputted from the output module, and generates a word level down request signal indicating lowering the word level of the changeable word for the user whose exposure count is equal to or more than a preset exposure count, and wherein the word storage module lowers the word level, for the user, of the changeable word corresponding to the word level down request signal.

2. The apparatus of claim 1, wherein the book configuration module detects the arrangement locations of the changeable word and the fixed word from the text information, and generates the electronic book by arranging the changeable word and the fixed word at the detected arrangement locations.

3. The apparatus of claim 2, wherein the book configuration module generates the electronic book by arranging the changeable word, received as a response to the word detection request signal, at the arrangement position of the changeable word detected from the text information.

4. The apparatus of claim 1, wherein the word storage module associates changeable words, which have the same meaning and different word levels, with the same word identifier, and stores the changeable words.

5. The apparatus of claim 1, further comprising an input module configured to receive one piece of selection information among a normal reading level, a high reading level and a low reading level, in order to set the user reading level.

6. The apparatus of claim 1, further comprising an input module configured to receive selection information including the changeable word of the electronic book outputted from the output module, wherein the book configuration module detects a changeable word which is associated with the same word identifier as the changeable word selected on the basis of the selection information, and associated with a word level different from the selected changeable word, and the output module replaces the selected changeable word with the changeable word detected by the book configuration module, and outputs the electronic book.

7. The apparatus of claim 6, wherein the book configuration module generates a collection screen including changeable words changed on the basis of the selection information of the input module and the changeable words before the change.

8. A method for providing an electronic book, using an apparatus for providing an electronic book, the method comprising:

storing changeable words for each user such that the word levels associated the changeable words are different for at least two users;

detecting book information including text information, based on a book identifier;

detecting the word identifier of a changeable word and a fixed word from the book information detected in the detecting of the book information;

generating an electronic book for a user by arranging the word identifier of the changeable word and the fixed word, which are detected in the detecting of the word identifier of the changeable word and the fixed word;

detecting a user reading level of the user;

detecting a word identifier included in the electronic book generated in the generating of the electronic book;

detecting a changeable word based on the user reading level and the word identifier;

arranging the changeable word, detected in the detecting of the changeable word, in the electronic book generated in the generating of the electronic book such that a changeable word whose word level is corresponding to the detected user reading level;

outputting the electronic book in which the changeable word is arranged; and setting the word level of the changeable words based on the generated electronic book, wherein the setting the word level of the changeable words including:

counting the number of exposures of each of the changeable words included in the electronic book outputted for the user; and lowering the word level, for the user, of the changeable word whose exposure count is equal to or more than a preset exposure count.

9. The method of claim 8, wherein the detecting of the word identifier of the changeable word and the fixed word comprises further detecting the arrangement locations of the changeable word and the fixed word, wherein the generating of the electronic book comprises generating an electronic book by arranging the word identifier of the changeable word and the fixed word at the arrangement positions detected in the detecting of the word identifier of the changeable word and the fixed word.

10. The method of claim 8, wherein the arranging of the changeable word comprises arranging the changeable word, detected in the detecting of the changeable word, at an arrangement position matched with the word identifier.

11. The method of claim 8, further comprising associating changeable words, which have the same meaning and different word levels, with the same word identifier, and storing the changeable words, before the detecting of the changeable word.

12. The method of claim 8, wherein the detecting of the user reading level comprises receiving one piece of selection information among a normal reading level, a high reading level and a low reading level.

13. The method of claim 8, further comprising:

receiving selection information including the changeable words of the electronic book, after the outputting of the electronic book; and replacing a changeable word selected among the changeable words of the electronic book with another changeable word, based on the selection information, and outputting the electronic book, wherein the replacing of the changeable word comprises detecting a changeable word which is associated with the same word identifier as the selected changeable word and associated with a word level different from the selected changeable word, replacing the selected changeable word with the detected changeable word, and outputting the electronic book.

14. The electronic book providing method of claim 13, further comprising generating a collection screen including the changeable word changed on the basis of the selection information and the changeable word before the change.

\* \* \* \* \*